US012762064B1

(12) United States Patent
Favor et al.

(10) Patent No.: US 12,762,064 B1
(45) **Date of Patent: *Oct. 13, 2026**

(54) NON-CACHEABLE ACCESS HANDLING IN PROCESSOR WITH VIRTUALLY-TAGGED VIRTUALLY-INDEXED DATA CACHE

(71) Applicant: Ventana Micro Systems Inc., Cupertino, CA (US)

(72) Inventors: John G Favor, San Francisco, CA (US); Srivatsan Srinivasan, Cedar Park, TX (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/798,452

(22) Filed: Aug. 8, 2024

Related U.S. Application Data

(63) Continuation of application No. 18/199,784, filed on May 19, 2023, now Pat. No. 12,061,555.

(51) Int. Cl.

| | |
|---|---|
| ***G06F 12/0888*** | (2016.01) |
| ***G06F 12/0837*** | (2016.01) |
| ***G06F 12/0891*** | (2016.01) |
| ***G06F 12/1045*** | (2016.01) |

(52) U.S. Cl.
CPC ...... *G06F 12/0888* (2013.01); *G06F 12/0837* (2013.01); *G06F 12/0891* (2013.01); *G06F 12/1063* (2013.01)

(58) Field of Classification Search
None
See application file for complete search history.

(56) References Cited

U.S. PATENT DOCUMENTS

| | | | |
|---|---|---|---|
| 12,061,555 | B1 | 8/2024 | Favor et al. |
| 2015/0378927 | A1 | 12/2015 | Bradbury et al. |
| 2019/0026226 | A1 | 1/2019 | Boyd et al. |

*Primary Examiner* — Charles J Choi
(74) *Attorney, Agent, or Firm* — W&T

(57) ABSTRACT

A load/store circuit performs a first lookup of a virtual address in a first-level data cache that misses and generates a fill request that causes translation of the virtual address into a physical address, receives a response that indicates the physical address is in a non-cacheable memory region and is without data from the physical address, allocates a data-less entry in the data cache that includes an indication that the entry is associated with a non-cacheable memory region, performs a second lookup of the virtual address in the data cache, determines the virtual address hits on the data-less entry, and determines that the entry is associated with a non-cacheable memory region. Rather than reading data from or writing data to the data cache as normally done for load or store instructions, respectively, the data is read from or written to non-cacheable memory region via a processor bus.

27 Claims, 6 Drawing Sheets

NON-CACHEABLE ACCESS HANDLING IN PROCESSOR WITH VIRTUALLY-TAGGED VIRTUALLY-INDEXED DATA CACHE

CROSS REFERENCE TO RELATED APPLICATION(S)

This application is a continuation of U.S. Non-Provisional application Ser. No. 18/199,784, filed May 19, 2023, and which is hereby incorporated by reference in its entirety.

BACKGROUND

Modern computing systems/devices include system memory, also referred to as main memory, and a processor, also referred to as a central processing unit (CPU). The system memory is used to hold program instructions and data processed by the program instructions and is often implemented as dynamic random-access memory (DRAM) because of its relatively low cost per megabyte. The processor fetches instructions from the system memory and executes them to process the data. The processing of the data includes reading the data from memory, processing it, and writing results back to memory. The processor and system memory are connected by a processor bus. The processor bus includes an address bus, a data bus, and a control bus. The processor places on the address bus the address of the location in system memory the processor wants to access and indicates on the control bus whether it wants to read or write. In the case of a read, the memory returns on the data bus to the processor the data from the address in system memory specified on the address bus. In the case of a write, the processor provides data on the data bus that is written to the address in system memory specified on the address bus. The range of addresses that may be specified on the address bus is referred to as the address space of the processor. The system memory is mapped by the operating system into a range of addresses within the address space of the processor. The range of addresses is also referred to as a memory region.

In many systems, the number of clock cycles required to read/write the memory is on the order of one hundred clock cycles of the processor. For this reason, modern processors include one or more cache memories, or caches, which are memories within the processor that are relatively much smaller and faster than the system memory. The caches are typically implemented as static random-access memory (SRAM) because of its relatively low access time, which is often only a few processor clock cycles. That is, the number of clock cycles required to access system memory may often be an order or magnitude greater than the number of clock cycles required to access a first-level cache in the processor. The caches hold recently accessed data brought into the processor from system memory. The caches tend to serve to reduce the time required to access data according to the well-known property of locality of reference.

In addition to system memory, computing systems also typically include memory-mapped I/O devices, such as disk controllers, graphics controllers, network interface controllers (NICs), keyboard/mouse controllers, Universal Serial Bus (USB) controllers, direct memory access (DMA) controllers, Small Computer Systems Interface (SCSI) controllers, etc. The I/O devices include control/status registers (CSRs) that are written and read by the operating system, e.g., device drivers. The I/O devices may also include memories in addition the CSRs. Like the system memory, the CSRs of the I/O device are mapped into one or more memory regions of the processor address space. To control the I/O device, the processor reads and/or writes the CSRs via the processor bus. For example, device drivers of the operating system typically communicate with the CSRs of the I/O device to write commands and read status and to write data to the I/O device memory and/or read data from it.

If the processor were to cache accesses (reads and writes) from/to the I/O devices, incorrect operation would likely result, for reasons described below. Therefore, many processors provide a mechanism for specifying non-cacheable memory regions. That is, many processors provide the ability for the operating system to assign memory types, or memory attributes, to different memory regions of the processor address space. In particular, the processor may provide the ability to indicate that the memory region in which a memory-mapped I/O device is located is a non-cacheable memory region, but to indicate the memory region in which system memory is located is cacheable.

To illustrate the incorrect operation that might result if the processor were to cache I/O device accesses, assume a device driver periodically reads a status register of an I/O device, which is commonly referred to as "polling." For example, a disk controller device driver may write a command to a command register of the disk controller (e.g., to write a sector's worth of data to the disk drive) and then sit in a loop polling the status register to determine whether the disk controller has completed the command. Each time the device driver reads the status register, it needs to receive the current value of the status register, i.e., it needs the processor to perform a read transaction on the processor bus from the status register since it is the change of the status register value over time that the device driver is attempting to detect. However, assume the processor cached the value read from the status register the first time through the loop and returned the cached value of the status register for each of the subsequent times through the loop rather than reading the status register on the processor bus. In this case, assuming the cached value indicates the command has not yet been completed, the device driver may sit in the loop forever thinking that the command had not completed- or at least not until the cached value is evicted from the cache such that the processor again reads from the status register via the processor bus-when in fact the command may have been completed long ago. By assigning a non-cacheable memory attribute to the memory-mapped I/O device, this problem may be avoided. That is, the processor does not cache accesses to the non-cacheable memory region associated with the memory-mapped I/O device.

To further illustrate the incorrect operation that might result if the processor were to cache I/O device accesses, when the device driver executes a store instruction to write to the I/O device, if the processor caches (in a write-back fashion) the data to be written, then the data will go into the cache and not make it out to on the processor bus to the I/O device—or at least not until the data is written back, e.g., in response to a replacement of the entry in the cache holding the data. The amount of time between when the store instruction retires and the data is written back—and therefore written to the I/O device—is non-deterministic, whereas the device driver assumes the data has been written to the I/O device once the store instruction retires. This could result in, among other things, a read from the I/O device (e.g., due to execution of a load instruction by the device driver) to be performed from the I/O device on the processor bus in a different order than the device driver intended, e.g., the status could be read from the I/O device before the associated command is written to the I/O device.

Additionally, most modern processors perform speculative execution of instructions. For example, a processor may predict the outcome of a branch instruction and begin to fetch and execute instructions down the predicted path. The instructions are termed "speculatively executed" because the processor may subsequently detect that it incorrectly predicted the branch, i.e., it should have fetched and executed instructions down a different path. In such case, the processor must flush the results of the speculatively executed instructions to avoid incorrect processing of the program. For example, speculative execution of a load instruction may involve performing a read on the processor bus from the load address and subsequently flushing the load data in response to detection of the misprediction rather than updating architectural state (the destination register specified by the load instruction). Such speculative execution does not cause incorrect operation if the load address is in the memory region directed to system memory. However, incorrect operation may occur if the load address is in a memory region in which an I/O device is located. For example, for some I/O devices, a read of a status register may cause the I/O device to change its state, e.g., to clear a flag or other value (e.g., error code) in another status register or free up an internal resource (e.g., buffer) within the I/O device. Thus, even though the architectural state of the processor may not be changed by the load data due to its subsequent flush, the read on the processor bus from the I/O device caused by the speculative execution of the load instruction may change the state of the I/O device unbeknownst to the device driver, causing incorrect operation.

Most modern processors provide virtual memory support, which involves the translation of a virtual address (e.g., specified by a load/store instruction) to a physical address. The physical address is the address that is presented on the processor bus to access system memory or a memory-mapped I/O device. The operating system maintains translation tables, or page tables, that specify the mapping of virtual addresses to physical addresses, typically on the granularity of a page of memory (e.g., 4 KB). Modern processors typically include translation-lookaside buffers (TLBs) to cache the virtual-to-physical address translations to avoid having to perform a page table walk to obtain the virtual-to-physical address translation from the page tables for each memory access. An indication of whether the memory page is cacheable or uncacheable is typically also cached in each TLB entry along with the address translation.

The first-level caches of most processors are physically-tagged. That is, when a cache line of data read from a physical address in system memory is allocated into an entry of the physically-tagged cache, an index portion of the physical address is used (in conjunction with a replacement algorithm in the case of a set-associative cache) to select the entry of the cache for allocation, and a tag of the entry is written with a tag portion of the physical address from which the cache line data was read. Furthermore, when a physical address is looked up in the physically-tagged cache to determine whether the physical address hits in the cache, i.e., whether the data associated with the line of memory specified by the physical address is currently present in the cache, the index portion of the physical address is used to select an entry of the cache, and the tag portion of the physical address is used to compare with the tag of the selected entry. If a match occurs and the entry is valid, a cache hit has occurred, and the data in the hit upon entry is provided by the cache.

To lookup a physical address in a physically-tagged cache in a virtual memory system, the virtual address must be translated into a physical address. The virtual address is first looked up in a first-level TLB which provides the physical address translation (assuming a hit in the TLB). Thus, in a processor with a physically-tagged first-level cache, determining a hit or miss is a two-step sequential process: first access the TLB to get the physical address translation, then use the physical address to access the physically-tagged cache. As described above, the TLB also provides the memory attribute that indicates whether the access is to a cacheable or non-cacheable memory region so that the processor may perform the correct type of access, i.e., a cacheable or non-cacheable access. That is, the TLB informs the processor whether it can cache the access.

The number of clock cycles required to perform a lookup in the first-level cache is one of the most important performance parameters in high performance processors and is commonly referred to as the load-to-use latency. One technique for reducing the load-to-use latency is to employ a first-level cache that is virtually-indexed and virtually-tagged. That is, a virtual address rather than a physical address is used to allocate into the virtually-indexed, virtually-tagged cache, and a virtual address rather than a physical address is looked up in the virtually-indexed, virtually-tagged cache. More specifically, when a cache line of data read from (a physical address in) system memory is allocated into an entry of the virtually-indexed, virtually-tagged cache, an index portion of the virtual address (that was translated into the physical address in response to a miss of the virtual address in the virtually-indexed, virtually-tagged cache) is used (in conjunction with a replacement algorithm in the case of a set-associative cache) to select the entry of the cache for allocation, and a tag of the entry is written with a tag portion of the virtual address. Furthermore, when a virtual address is looked up in the virtually-indexed, virtually-tagged cache to determine whether the virtual address hits in the cache, the index portion of the virtual address is used to select an entry of the cache, and the tag portion of the virtual address is used to compare with the tag of the selected entry. If a match occurs and the entry is valid, a cache hit has occurred.

Thus, in a processor that employs a virtually-indexed, virtually-tagged first-level cache, a lookup of the virtual address in the first-level TLB to obtain the physical address need not be performed before the first-level cache can be accessed, and thus the load-to-use latency may be advantageously reduced. However, the memory attribute that indicates whether the access is to a cacheable or non-cacheable memory region is still needed so that the processor may perform the correct type of access, i.e., a cacheable or non-cacheable access. A solution is to access the first-level TLB in parallel with the first-level virtually-indexed, virtually-tagged cache to obtain the memory attribute. However, accessing the first-level TLB in parallel with the first-level virtually-indexed, virtually-tagged cache to obtain the memory attribute may consume a considerable amount of power.

DETAILED DESCRIPTION

Figure 1:
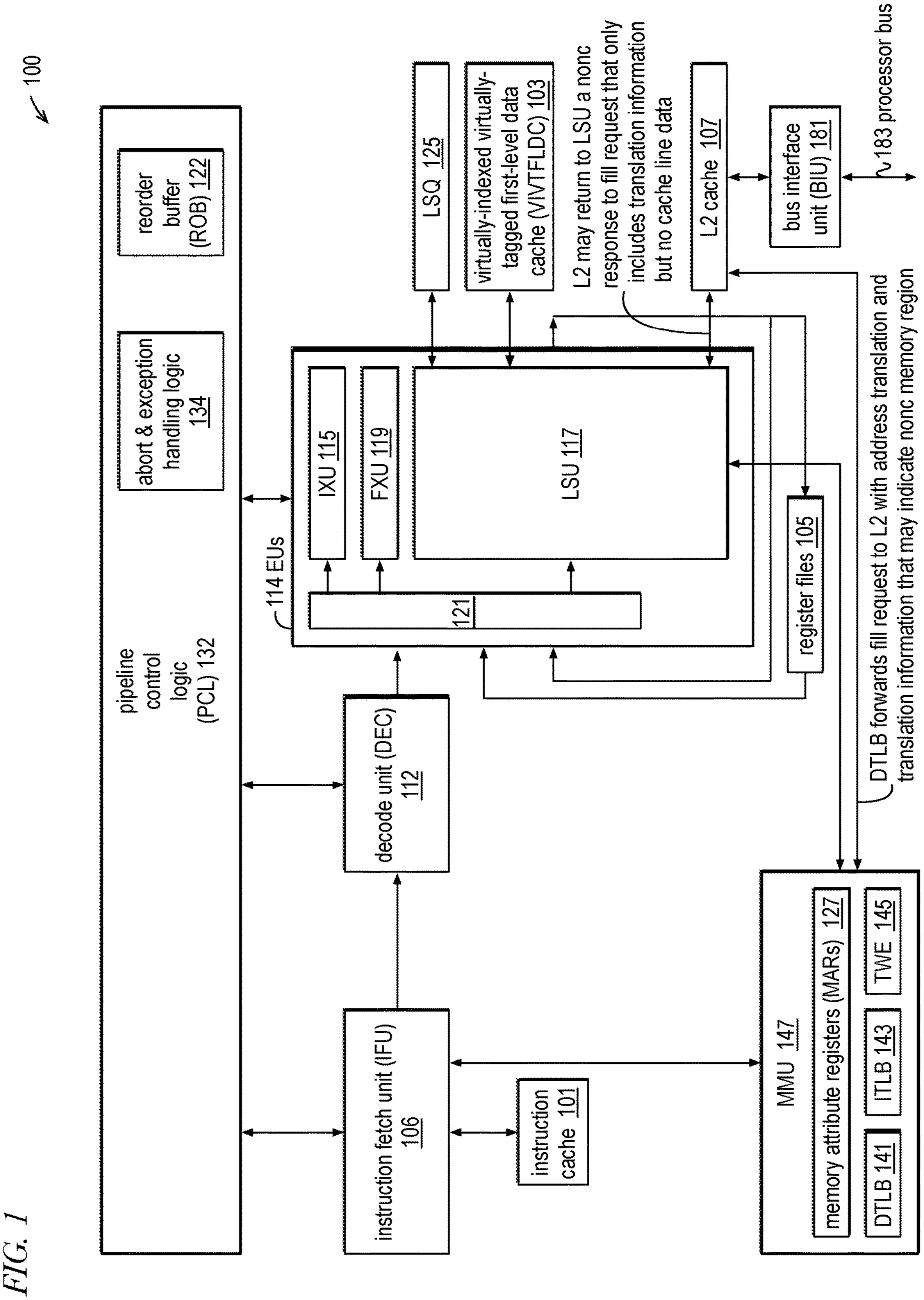
FIG. 1 is an example block diagram of a pipelined super-scalar, out-of-order execution microprocessor core that includes a virtually-indexed virtually-tagged first-level data cache (VIVTFLDC) that is used to perform non-cacheable access handling in accordance with embodiments of the present disclosure.

Embodiments are described in which accesses to non-cacheable (nonc) memory regions, e.g., memory regions having write-combinable (WC) or input/output (I/O) memory attributes, are processed by a processor having a virtually-indexed virtually-tagged first level data cache (VIVTFLDC). A non-cacheable load/store initially is executed in a first instance by a load/store unit (LSU) and misses in the VIVTFLDC, generates a fill request, allocates a fill request buffer entry, gets replayed, and waits in a scheduler on a memory dependence operand associated with the fill buffer entry. The fill request goes through a second-level data translation lookaside buffer (DTLB) and comes back to the VIVTFLDC as a special type of fill response that is absent cache line data but includes the usual permissions and attributes. The attributes indicate whether the access is to a cacheable or non-cacheable address. The response is used to fill a special data-less entry in the VIVTFLDC with the permissions and attributes. When the scheduler re-issues the non-cacheable load/store to the LSU for a second execution instance, the non-cacheable load/store hits on the data-less entry and receives the permission and attribute information which enables it to recognize that it is in fact a non-cacheable load/store access. To this point, both cacheable and non-cacheable load/store instructions may issue and execute speculatively and out-of-order. That is, non-cacheable load/store instructions may also execute speculatively and out-of-order until they know that they are non-cacheable.

Any subsequent non-cacheable load/store can hit on the data-less entry and benefit from the one-time fill of the permissions and attributes-specifically the indication of whether the address is cacheable or non-cacheable-into the VIVTFLDC rather than having to re-access the DTLB for each non-cacheable load/store. In an embodiment, that data-less entries in the VIVTFLDC are subject to the same replacement policy as all other entries in the VIVTFLDC.

Subsequent processing of a non-cacheable store is similar to a cacheable store, except non-cacheable store is treated as unforwardable with respect to any load that attempts to forward from the non-cacheable store. The non-cacheable store goes into the store queue, commits from the store queue, does not update the VIVTFLDC, and eventually goes out to the processor bus. Although each of the execution instances of the store may be speculative, the commit of both cacheable stores and non-cacheable stores to architectural state is performed in a non-speculative manner, i.e., cacheable stores are written to cache in a non-speculative manner, and non-cacheable stores are written to the memory-mapped I/O device in a non-speculative manner.

Subsequent processing of non-cacheable loads is more involved since they are performed non-speculatively. When a non-cacheable load hits on the data-less entry and realizes it is a non-cacheable access, it generates a non-cacheable data read request that specifies a read that is the size specified by the non-cacheable load (e.g., 1, 2, 4, or 8 bytes), rather than an entire cache line. The non-cacheable load gets replayed and waits in the scheduler on a memory dependence operand associated with the non-cacheable data read request. Like a non-cacheable store, a non-cacheable load ignores any forwarding prediction and does not try to forward from a store in the store queue.

The LSU includes a one-entry non-cacheable read request buffer (NRRB) that holds the non-cacheable data read request until the non-cacheable load becomes oldest outstanding in the re-order buffer (ROB). The NRRB is tagged with the RobID of the non-cacheable load and watches the RobID of the next entry to be retired received from pipeline control logic (PCL). When a match occurs, the non-cacheable data read request is now non-speculative and is sent on to the processor bus. Before then, as other loads execute (out-of-order) and discover that they are non-cacheable accesses, the NRRB always records the non-cacheable data read request from the oldest such non-cacheable load. That is, if a new non-cacheable load's request is older than the current pending request, then the current request is replaced with the new request. In any case, a buffered request will not move out of the buffer until it becomes oldest outstanding and thus also can no longer be replaced by another request. Once the request is sent out, the NRRB is invalidated and is now available to hold a new non-cacheable data read request from a younger non-cacheable load.

The LSU also includes a one-entry non-cacheable data buffer (NDB) into which the non-cacheable data is returned, which wakes up the non-cacheable load waiting in the scheduler. When a non-cacheable data read request is sent out by the LSU, the NDB is initialized as invalid and is marked with the RobID associated with the non-cacheable load. When the non-cacheable load is awakened and re-executes and its RobID matches the RobID of the NDB, it ignores the access of the VIVTFLDC (e.g., does not need to hit again on the data-less entry) during the third execution instance of the load, receives the result data from the NDB, and invalidates the NDB. The non-cacheable load also ignores any predicted forwarding from a store queue entry.

In the case that there are multiple non-cacheable loads in the scheduler, when each executes and discovers that it is a non-cacheable access, it gets replayed as described the above. The generated non-cacheable data read request may or may not get recorded into the NDB, but the memory dependence operand associated with the non-cacheable data read request ensures that all non-cacheable loads will wake up upon the return of the non-cacheable data for the oldest non-cacheable data read request. The oldest non-cacheable data read request receives the non-cacheable data, whereas the others again hit on the data-less entry and determine they are a non-cacheable access, and ultimately the non-cacheable data read request for the next oldest non-cacheable load will be recorded into the NRRB.

Although each of the execution instances of a load by the LSU may be speculative, the read of data from the I/O device associated with a non-cacheable load is performed in a non-speculative manner. That is, the data is read from the I/O device only after there is no longer any possibility that the load will be aborted, e.g., in response to detection of a branch misprediction. This contrasts with cacheable loads for which data may be read from the cache in a speculative manner, i.e., even when there is still a possibility that the load will be aborted. However, in an embodiment, in the case of [a] a non-cacheable load from a memory region having a WC memory attribute, the data may be read from the I/O device (e.g., a graphics controller) in a speculative manner, even though the data is not cached in a cache of the processor.

As may be inferred, having a VIVTFLDC, the embodiments are absent a first-level (L1) TLB. That is, because the VIVTFLDC is indexed and tagged with a virtual address, there is no need for a physical address to access the VIVTFLDC and therefore no need for a L1 TLB to provide a physical address translation of the virtual address. Instead, the processor includes a second-level (L2) physically-indexed physically-tagged cache and a L2 TLB, also referred to as the DTLB, that provides physical address translations used to access the L2 cache and that provides the permissions and attributes-including the non-cacheable indications-used to fill the data-less entries in the VIVTFLDC. In this sense, the VIVTFLDC effectively functions as a L1 TLB in the context of non-cacheable access processing.

FIG. 1 is an example block diagram of a pipelined super-scalar, out-of-order execution microprocessor core 100 that includes a virtually-indexed virtually-tagged first-level data cache (VIVTFLDC) 103 that is used to perform non-cacheable access handling in accordance with embodiments of the present disclosure. Although a single core 100 is shown, the non-cacheable access handling methods described herein are not limited to a particular number of cores. Generally, the non-cacheable access handling methods may be employed in a processor conforming to various instruction set architectures (ISA), including but not limited to, x86, ARM, PowerPC, SPARC, MIPS, and RISC-VISA.

The core 100 comprises a pipeline that includes an instruction cache 101, an instruction fetch unit (IFU) 106, a decode unit (DEC) 112, and a plurality of execution units (EU) 114. The core 100 also includes the VIVTFLDC 103, a L2 cache 107, a load/store queue (LSQ) 125, and register files 105. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117. The core 100 also comprises a bus interface unit 181, coupled to the L2 cache 107, that communicates with other elements of the system that comprises the core 100 via a processor bus 183.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, a table walk engine (TWE) 145, and memory attribute registers (MARs) 127. As described above, the DTLB 141 operates as a L2 TLB that provides to the L2 cache 107 (e.g., in a forwarded fill request) virtual-to-physical address translations used to access the physically-indexed physically-tagged L2 cache 107. In one embodiment, the DTLB 141 comprises multiple TLBs for different page sizes, e.g., a 4 KB page size TLB, a 2 MB page size TLB, and a 1 GB and 512 GB page size TLB. Similarly, the ITLB 143 provides virtual-to-physical address translations used to access the instruction cache 101. The MARs 127 may be programmed by the operating system to map memory regions to memory attributes, or memory types. Examples of memory attributes are write-back (WB), write-combine (WC), and input/output (I/O), which may also be referred to as uncacheable (UC). A WB memory type is an example of a cacheable memory attribute, whereas WC and I/O are examples of non-cacheable memory attributes. Examples of MARs 127 include physical memory attribute (PMA) registers in the RISC-V instruction set architecture (ISA) and memory type range registers (MTRRs) in the x86 ISA. In each of the RISC-V and x86 ISAs, the memory attributes specified in a PMA register or MTRR, respectively, may be modified by page tables for a page of physical address space, and in the ARM ISA page tables may specify the memory attribute.

The DTLB 141 also provides to the L2 cache 107 (e.g., in a forwarded fill request) translation information, including memory attributes that indicate whether the page associated with the physical address translation is cacheable or non-cacheable. As described herein, the cacheable/non-cacheable indications may be filled into entries of the VIVTFLDC 103 and hit upon by speculatively executed load/store instructions, including load/store instructions that access non-cacheable memory regions. If the DTLB 141 receives a fill request and determines the physical address translation is to a non-cacheable memory region, the translation information forwarded in the fill request by the DTLB 141 to the L2 cache 107 indicates the physical address translation is to a non-cacheable memory region. In this case, the L2 cache 107 returns to the LSU 117 a special response to the fill request that includes only the translation information but no cache line data. The LSU 117 may use the special fill response to create a special data-less entry in the VIVTFLDC 103 that includes the non-cacheable indication.

The microprocessor 100 may also include other blocks not shown, such as a write combining buffer (WBC), a load buffer, a bus interface unit, and various levels of cache memory above the instruction cache 101 and VIVTFLDC 103 and L2 cache 107, some of which may be shared by other cores of the processor. Furthermore, the core 100 may be multi-threaded in the sense that it includes the ability to hold architectural state (e.g., program counter, architectural registers) for multiple threads that share the execution units 114 to perform simultaneous multithreading (SMT).

Pipeline control logic (PCL) 132 is coupled to and controls various aspects of the pipeline. The PCL 132 includes a ReOrder Buffer (ROB) 122 and abort and exception-handling logic 134.

The IFU 106 fetches instructions from the instruction cache 101 and provides the fetched instructions to the DEC 112. The IFU 106 maintains the program counter (PC) and may include predictors that predict program flow that may be altered by control flow instructions, such as branch instructions.

The DEC 112 may decode architectural instructions into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that can execute up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order. Both micro-architectural Ops and architectural instructions may be referred to as "instructions" herein.

The IFU 106, DEC 112, and EUs 114 form a pipeline in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op. Instructions are allocated into the ROB 122 in program order.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available. The IFU 106, DEC 112, each of the execution units 114, and PCL 132, as well as other structures of the core 100, may each have their own pipeline stages in which different operations are performed.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed after completion of their execution by the LSU 117. Still further, an Op may be committed before it is retired.

The core 100 provides virtual memory support. Each process, or thread, running on the core 100 may have its own address space identified by an ASID. The core 100 may use the ASID to perform address translation. For example, the ASID may be associated with the page tables, or translation tables, of a process. To distinguish entries for different processes, each entry of the TLBs (e.g., DTLB 141 and ITLB 143) may include in its tag the ASID associated with the operation that caused the fill of the entry into the TLB. In the x86 ISA, for example, an ASID may correspond to a processor context identifier (PCID). As described above, because the VIVTFLDC 103 holds translation information (e.g., permissions and attributes, including cacheable/non-cacheable indications) within each entry, it effectively operates as a first-level TLB.

Figure 2:
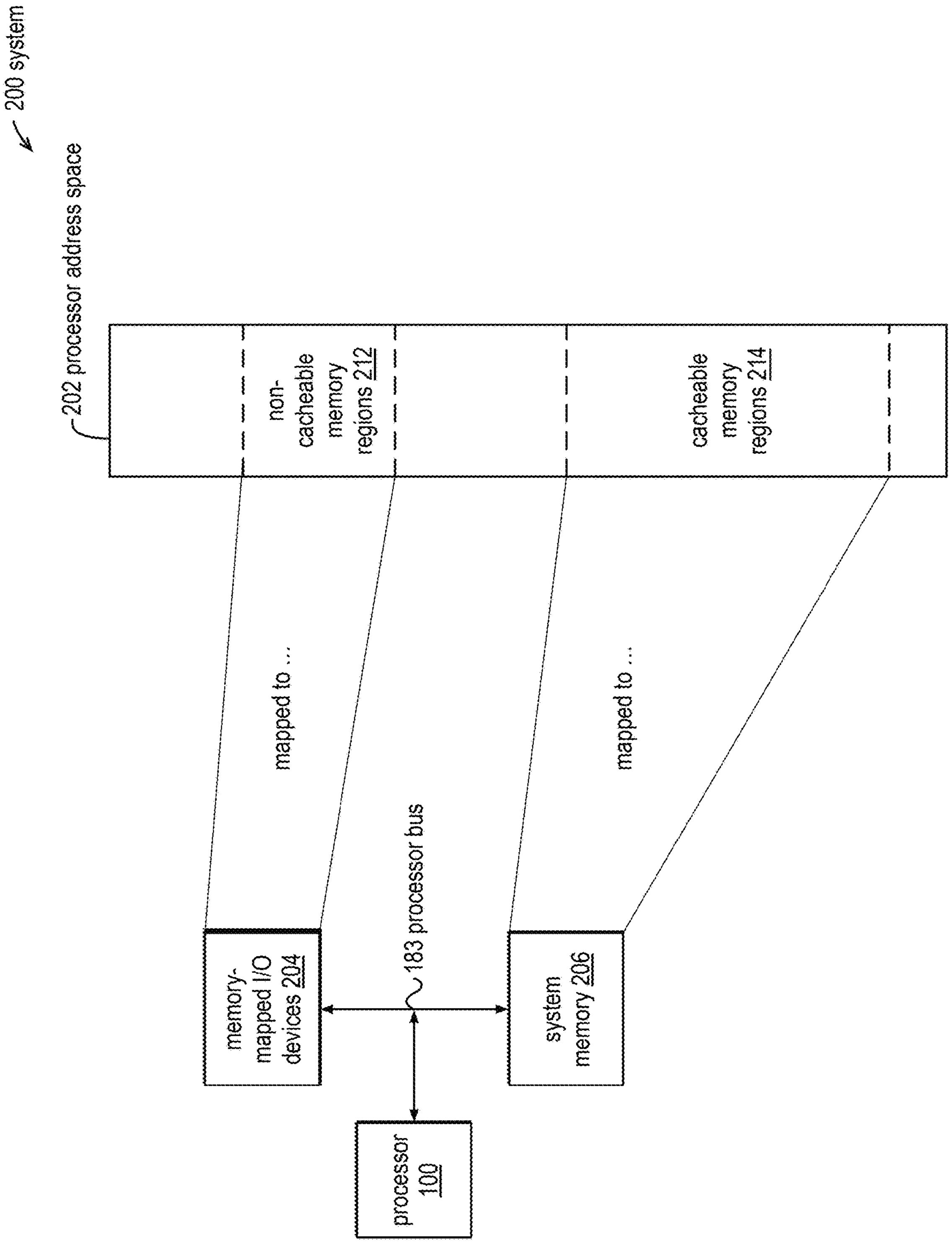
FIG. 2 is an example block diagram of a system that comprises the processor and processor bus of FIG. 1 in accordance with embodiments of the present disclosure.

FIG. 2 is an example block diagram of a system 200 that comprises the processor 100 and processor bus 183 of FIG. 1 in accordance with embodiments of the present disclosure. The system 200 also includes memory-mapped I/O devices 204 and system memory 206 coupled to the processor bus 183. The processor 100 has a processor address space 202 that can be accessed via the processor bus 183. The processor address space 202 is the set of possible addresses that the processor 100 can generate on the processor bus 183. The operating system may separate the processor address space 202 into different mutually exclusive memory regions, i.e., subsets of address ranges, based upon the type of device the processor 100 accesses in each memory region. In an embodiment, the operating system may create both cacheable memory regions 214 and non-cacheable memory regions 212 (e.g., via PMA registers, MTRRs, and/or page tables) into which memory-mapped I/O devices 204 and system memory 206, respectively, may be mapped. The system memory 206 may be dynamic random-access memory (DRAM), for example. The memory-mapped I/O devices 204 may be disk controllers, graphics controllers, network interface controllers (NICs), keyboard/mouse controllers, Universal Serial Bus (USB) controllers, direct memory access (DMA) controllers, Small Computer Systems Interface (SCSI) controllers, etc. Although in the embodiment of FIG. 2 the I/O devices 204 and system memory 206 are connected to the processor bus 183, in other embodiments there may be other buses in the system 200 between the processor bus 183 and the I/O devices 204 and/or system memory 206, e.g., a system bus or peripheral bus.

Figures 3A, 3B, 3C, 3D:
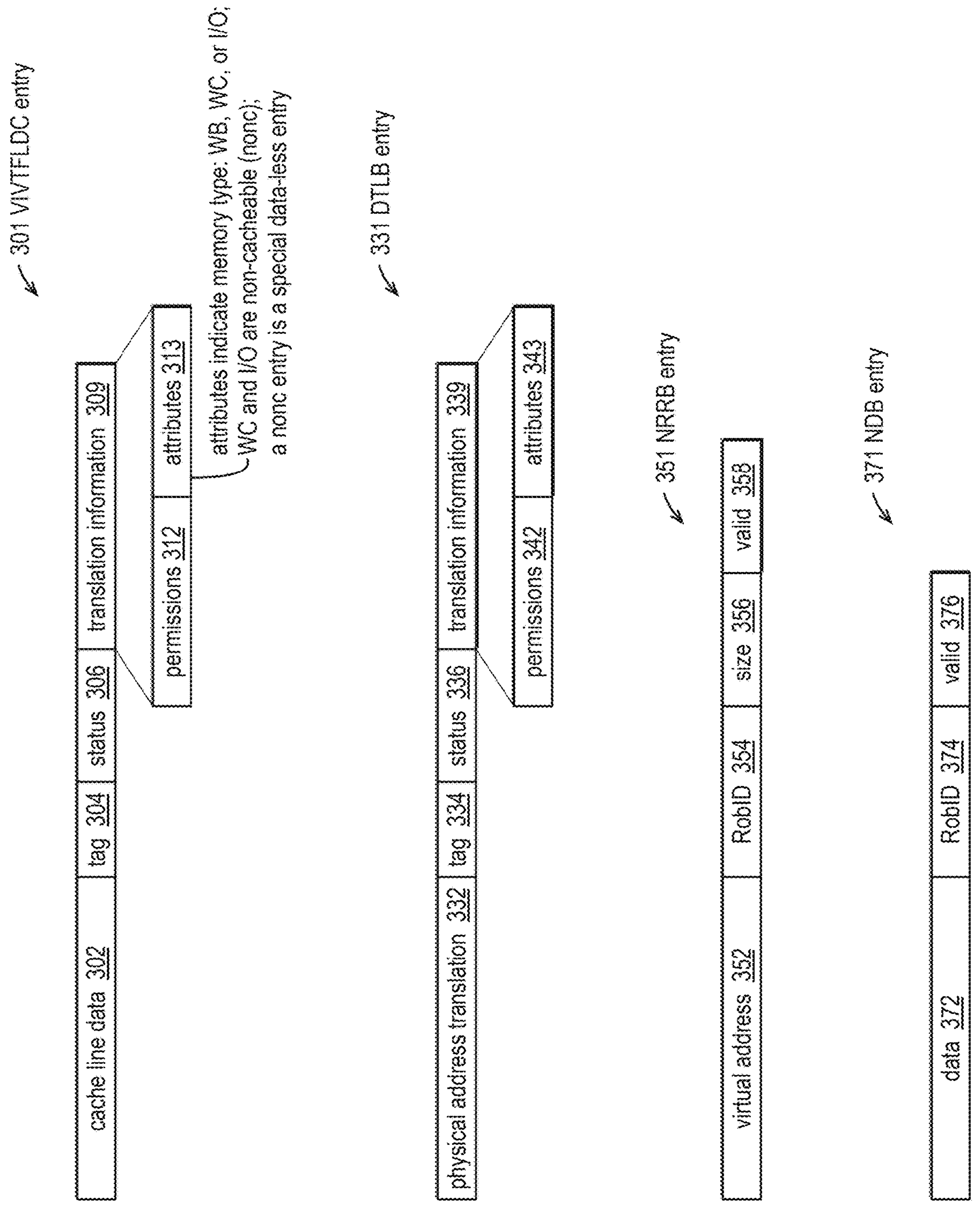
FIG. 3A is an example block diagram of a cache entry of the VIVTFLDC of FIG. 1 in accordance with embodiments of the present disclosure.
FIG. 3B is an example block diagram of an entry of the second-level data translation lookaside buffer (DTLB) of FIG. 2 in accordance with embodiments of the present disclosure.
FIG. 3C is an example block diagram of an entry of the non-cacheable read request buffer (NRRB) of FIG. 4 in accordance with embodiments of the present disclosure.
FIG. 3D is an example block diagram of an entry of a non-cacheable data buffer (NDB) of FIG. 4 in accordance with embodiments of the present disclosure.

FIG. 3A is an example block diagram of a cache entry 301 of the VIVTFLDC 103 of FIG. 1 in accordance with embodiments of the present disclosure. The cache entry 301 is used in the embodiment of FIG. 4 described in more detail below. The cache entry 301 includes cache line data 302, a virtual address tag 304, a status field 306, and translation information 309. The translation information 309 includes permissions 312 and attributes 313 sub-fields. The permissions 312 specify memory access permissions such as whether a memory location has read permissions, write permissions, execute permissions, and permission to be accessed by a process executing at user privilege level. The attributes 313 specify access attributes of memory locations or memory regions such as the access types write-back (WB, i.e., cacheable), input/output (I/O, also referred to as uncacheable (UC), and write-combine (WC). The I/O and WC access types may be referred to generically as non-cacheable, or "nonc" as referred to herein. As described in more detail herein, an entry 301 whose attributes 313 indicate an association with a nonc memory region is a special entry 301 that is data-less, i.e., although the entry 301 itself is valid, the cache line data field 302 does not contain valid data associated with the virtual cache line address associated with the tag 304 and index to the VIVTFLDC 103. Thus, in this regard, the load/store instructions that miss in the VIVTFLDC 103 which cause an entry 301 to be allocated into the VIVTFLDC 103 may be both cacheable or nonc loads and stores, i.e., they may specify load/store virtual addresses in cacheable (e.g., write-back) memory regions or in nonc (e.g., I/O and WC) memory regions. In the case of a normal entry 301, i.e., not a data-less entry, the cache line data 302 is the copy of the data brought into the VIVTFLDC 103 from system memory, in some embodiments indirectly through a higher level of the cache memory hierarchy, e.g., L2 cache 107, in response to a miss of a cacheable load/store instruction in the VIVTFLDC 103. In the case of a load instruction, the cache line data 302 is provided as cache data 439 on data out bus 427 of FIG. 4 (unless the load instruction does not have permission to access the load address).

The tag 304 is upper bits of the virtual memory address (e.g., virtual address 423 of FIG. 4) specified by the instruction that brought the cache line into the VIVTFLDC 103, e.g., the virtual memory address specified by a load/store instruction. That is, when an entry in the VIVTFLDC 103 is allocated, the tag bits of the virtual memory address 423 are written to the virtual address tag 304 of the entry. When the VIVTFLDC 103 is subsequently accessed (e.g., by a subsequent load/store instruction), the virtual address tag 304 is used to determine whether the access hits in the VIVTFLDC 103. Generally speaking, the VIVTFLDC 103 uses lower bits (index bits) of the virtual memory address to index into the VIVTFLDC 103 and uses the remaining bits of the address above the index bits as the tag bits. To illustrate by way of example, assume a 64 kilobyte (KB) VIVTFLDC 103 arranged as a 4-way set associative cache having 64-byte cache lines; address bits [5:0] are an offset into the cache line, virtual address bits [13:6] (index bits) are used as the set index, and virtual address bits [N−1:14] (tag bits) are used as the tag, where N is the number of bits of the virtual memory address.

The status 306 indicates the state of the cache line. More specifically, the status 306 indicates whether the cache line data 302 is valid or invalid. Typically, the status 306 also indicates whether the cache line has been modified since it was brought into the VIVTFLDC 103. The status 306 may also indicate whether the cache line is exclusively held by the VIVTFLDC 103 or whether the cache line is shared by other cache memories in the system. An example protocol used to maintain cache coherency defines four possible states for a cache line: Modified, Exclusive, Shared, Invalid (MESI). In an embodiment, the VIVTFLDC 103 is a write-through cache and the states for a cache line are Invalid and Valid. A valid data-less entry 301, i.e., and entry associated with a nonc memory region, has a status other than Invalid, e.g., Valid or Exclusive.

Figure 4:
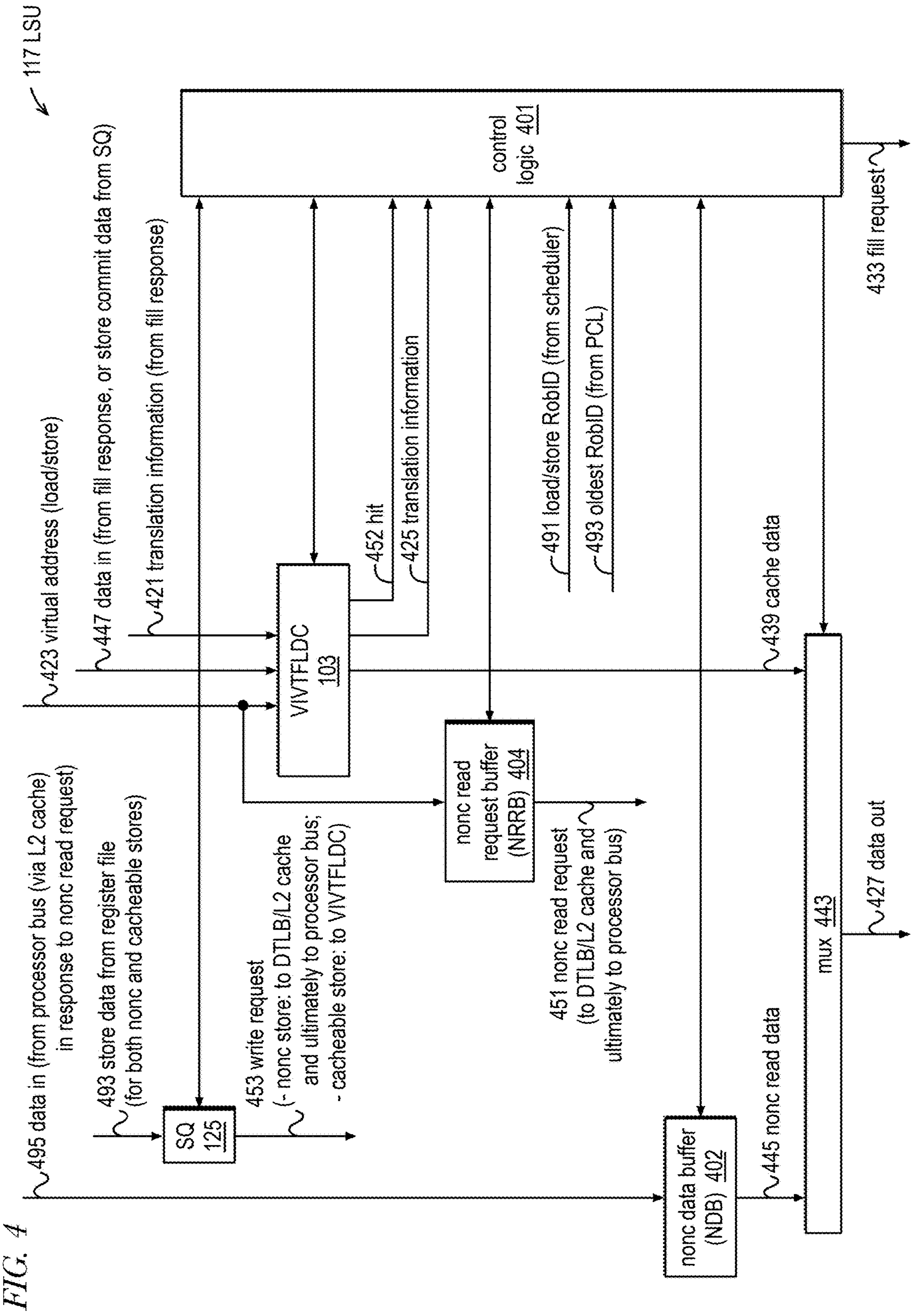
FIG. 4 is an example block diagram illustrating the load/store unit (LSU) and the VIVTFLDC of FIG. 1 in accordance with embodiments of the present disclosure.

The translation information 309 is populated via translation information 421 of FIG. 4 based on the fill request response received from the L2 cache 107, as described above. The translation information 309 is provided as translation information 425 of FIG. 4. The permissions 312 are reflective of permissions associated with a physical memory page that includes the cache line data associated with the entry 301. For example, the permissions 312 may be reflective of a valid/present bit from a page table entry (PTE) that indicates whether or not the implicated memory page is currently present in physical memory or has been paged out to a backing store. A page is not present if the valid/present bit in the PTE is clear. For another example, the permissions 312 may include indications of whether the memory page is readable, writable and/or executable. The permissions 312 may also include an indication whether the page is accessible by a user mode process. The permissions 312 may be used to determine whether a load/store instruction generates the need for an architectural exception. As described below, the MMU 147 returns the attributes 313 that indicate whether the access is to a cacheable or nonc memory region, e.g., obtained from the MARs 127 and/or PTEs.

FIG. 3B is an example block diagram of an entry 331 of DTLB 141 of FIG. 2 in accordance with embodiments of the present disclosure. The DTLB entry 331 includes a physical address translation 332, a virtual address tag 334, a status field 336, and translation information 339. The physical address translation 332 is a translation of a virtual address, e.g., such as virtual load/store addresses 423 of FIG. 4. The virtual address tag 334 and status 336 serve similar purposes to those of the address tag 304 and status 306 of FIG. 3A but for the DTLB 141. In one embodiment, the translation information 339 is similar to the translation information 309 of FIG. 3A. In one embodiment, the translation information 339 includes a global page indicator that is not included in the translation information 309 of FIG. 3A.

FIG. 3C is an example block diagram of an entry 351 of the nonc read request buffer (NRRB) 404 of FIG. 4 in accordance with embodiments of the present disclosure. The NRRB entry 351 includes a virtual address field 352, a RobID field 354, a size field 356, and a valid bit 358. The virtual address field 352 holds the virtual address of a nonc read request, which is the virtual address specified by a nonc load instruction. The RobID field 354 holds the RobID of the nonc load instruction from which the nonc read request is generated. The size field 356 holds the size, i.e., the number of bytes, specified by the nonc load instruction from which the nonc read request is generated. The valid bit 358 indicates whether the entry 351 is valid. Use of the NRRB entry 351 is described below.

FIG. 3D is an example block diagram of an entry 371 of a nonc data buffer (NDB) 402 of FIG. 4 in accordance with embodiments of the present disclosure. The NDB entry 371 includes a data field 372, a RobID field 374, and a valid bit 376. The data field 372 holds the data received in response to the sending on the processor bus 183 of the nonc read request held in the NRRB entry 351, which is the data specified by the nonc load instruction. The RobID field 374 holds the RobID of the nonc load instruction from which the nonc read request is generated. The valid bit 376 indicates whether the entry 371 holds valid data in the data field 372. Use of the NDB entry 371 is described below.

FIG. 4 is an example block diagram illustrating the LSU 117 and the VIVTFLDC 103 of FIG. 1 in accordance with embodiments of the present disclosure. The LSU 117 includes the store queue (SQ) 125 of FIG. 1, control logic 401, a nonc data buffer (NDB) 402, a nonc read request buffer (NRRB) 404, and a multiplexer 443. The control logic 401 receives a load/store RobID 491 from the scheduler 121 that specifies the RobID of the load/store instruction currently accessing the VIVTFLDC 103. The control logic 401 also receives an oldest RobID 493 from the PCL 132 that specifies the RobID of the oldest instruction in the ROB 122. The control logic 401 also receives a hit indicator 452 and translation information 425 from the VIVTFLDC 103. The control logic 401 controls the VIVTFLDC 103, the NRRB 404, the NDB 402, the SQ 125, and the mux 443, and the control logic 401 may generate a fill request 433 in response to its inputs, as described in more detail below.

The VIVTFLDC 103 receives a virtual load/store address input 423. The virtual load/store address 423 includes a tag portion and a set index portion as described above. The VIVTFLDC 103 is a virtual cache, i.e., it is virtually-indexed and virtually-tagged using the tag and set index portions of the virtual address 423. In the embodiment of FIG. 4, each entry of the VIVTFLDC 103 is structured as the entry 301 of FIG. 3A, having cache line data 302, a tag 304, a status 306, and translation information 309. The VIVTFLDC 103 also receives data in 447 for writing data into the VIVTFLDC 103, e.g., for writing store data during commit of a store instruction or for writing a cache line during a fill of an entry 301. The VIVTFLDC 103 also receives translation information 421. The DTLB 141 provides the translation information 421 in response to a fill request 433, and the translation information 421 is written to the translation information field 309 of the filled entry 301. As described in more detail below, in the case of a normal fill response, valid cache line data in 447 is written to the cache line data 302 along with the translation information 421; whereas, in the case of a nonc fill response, the entry 301 is data-less, i.e., no valid cache line data is written to the cache line data 302, but only the translation information 421 is written.

Because the VIVTFLDC 103 is virtually-indexed and virtually-tagged, no physical address bits are needed to access it and, therefore, the VIVTFLDC may be accessed before the virtual load/store address 423 is translated into a physical address. In an embodiment, the VIVTFLDC 103 is arranged as a 4-way set associative cache; however, other embodiments are contemplated in which the associativity has a different number of ways than four, including direct-mapped and fully associative embodiments.

In response to an access (e.g., load/store instruction), the VIVTFLDC 103 generates the hit output 452 provided to the control logic 401 to indicate whether the virtual address 423 hits in the VIVTFLDC 103. In the case of a miss, the control logic 401 generates a cache line fill request 433 and replays the load/store instruction as described below. The fill request 433 specifies the load/store address 423. The fill request 433 is provided to the DTLB 141. The DTLB 141, either via a hit in the DTLB 141 or via a page table walk performed by the TWE 145, translates the virtual address 423 into a physical address and obtains the translation information associated with the physical address translation, i.e., the permissions and attributes associated with the physical address translation, e.g., page present indicator, read/write/execute/user permissions, memory type associated with the memory page implicated by the load/store address. The DTLB 141 forwards the fill request 433 to the L2 cache 107 along with the address translation and the translation information. If the attributes indicate a nonc memory type (e.g., I/O or WC), i.e., the physical address specifies a nonc memory region 212, the L2 cache 107 returns to the LSU 117 a nonc fill response that includes the translation information but that does not include cache line data. If the attributes indicate a cacheable memory type (e.g., WB), i.e., the physical address specifies a cacheable memory region 214, after obtaining the specified cache line data either due to a hit in the L2 cache 107 or from system memory (or from a higher level in the cache hierarchy), the L2 cache 107 returns to the LSU 117 a normal fill response that includes the translation information and includes the implicated cache line data.

With respect to a replay of a load/store instruction according to an embodiment, the entry in the scheduler 121 allocated to the load/store instruction (e.g., when the DEC 112 dispatches the load/store instruction to the scheduler 121) remains valid until the load/store instruction completes execution, i.e., has proceeded through the pipeline of the LSU 117 to the point of being free of any possibility of being canceled, retried, replayed, or of needing to pre-op abort. Completion of execution of a load/store instruction may be signaled by reporting the execution completion to the ROB 122. The core 100 performs a pre-op abort when it flushes the IFU 106, the DEC 112, and selectively flushes instructions in the back-end (e.g., the EUs 114 and LSQ 125) that are younger than and including the load/store instruction. The LSU 117 cancels a load/store instruction if its execution is stopped, e.g., while in the LSU 117 pipeline after being issued thereto. The LSU 117 retries a load/store instruction when it resets its entry in the scheduler 121 to an unissued state. The LSU 117 replays a load/store instruction when it resets its entry in the scheduler 121 to an unissued state and initializes a memory-dependence operand of the entry with a memory dependency wakeup identifier. As described herein, when a load instruction hits on a data-less entry of the VIVTFLDC 103 that indicates the load instruction is to a non-cacheable memory region, the non-cacheable load instruction will be replayed. In the case of the fill request 433 generated in response to the VIVTFLDC 103 miss, the memory dependency wakeup identifier identifies the response to the fill request 433, e.g., the identifier of a fill buffer allocated to the fill request 433. Accordingly, the load/store instruction is awakened when the response to the fill request 433 fills the entry 301 in the VIVTFLDC 103 such that the scheduler 121 subsequently issues the load instruction a second time to the LSU 117. Generally, the scheduler 121 issues a load/store instruction to the LSU 117 when all source operands upon which the instruction depends are available for execution and a pipeline of the LSU 117 is available to execute the load/store instruction.

In the case of a hit, the VIVTFLDC 103 provides the translation information 309 of the hit entry 301 on the translation information output 425 to the control logic 401, which enables the control logic 401 to determine whether the hit entry 301 is a normal entry or data-less entry. That is, the translation information 425 enables the control logic 401 to determine whether the hit entry 301 was allocated in response to a nonc access (i.e., a load/store instruction that specifies a load/store address to a nonc memory region) or in response to a cacheable access (i.e., a load/store instruction that specifies a load/store address to a cacheable memory region).

In the case of a hit of a load instruction on a normal entry, the VIVTFLDC 103 provides the cache line data 302 of the normal hit entry 301 as cache data 439 to the mux 443, which the control logic 401 controls to select the cache data output 439 as data out 427. In the case of a hit of a store instruction on a normal entry, the store data 493 from the register file 105 is written into the entry of the SQ 125 previously allocated (e.g., by the DEC 112) to the store instruction. Eventually, when the store instruction is committed (e.g., becomes the oldest instruction in the ROB 122, or at least is known to be abort-free), the store data is written from the SQ 125 entry to the previously filled entry 301 of the VIVTFLDC 103.

Processing of a nonc load instruction from the point at which the nonc load instruction hits on a data-less entry 301 of the VIVTFLDC 103 will now be described, and processing of a nonc store instruction from the point at which the nonc store instruction hits on a data-less entry 301 of the VIVTFLDC 103 will be described after that.

In the case of a hit of a load instruction on a data-less entry that indicates an access to a nonc memory region, the control logic 401 examines the state of the NRRB 404 to determine which action to take. If the NRRB 404 is invalid, the control logic 401 populates and validates the NRRB 404 based on the load instruction. That is, the control logic 401 populates the virtual address 352 with the virtual address 423, populates the RobID 354 with the load/store RobID 491, populates the size 356 with the size specified by the load instruction, and sets the valid bit 358 to true. If the NRRB 404 is valid but the nonc load instruction is older than the load instruction associated with the valid NRRB entry 351 (i.e., the load/store RobID 491 is older than the RobID 354 of the NRRB entry 351), the control logic 401 overwrites the NRRB entry 351 based on the nonc load instruction. If the NRRB 404 is valid but the nonc load instruction is younger than the load instruction associated with the valid NRRB entry 351 (i.e., the load/store RobID 491 is younger than the RobID 354 of the NRRB entry 351), the control logic 401 does not update the NRRB 404. In all three cases, the LSU 117 replays the nonc load instruction with a memory dependency wakeup identifier that identifies the response to a nonc read request 451 sent from the NRRB 404 based on the contents of the NRRB 404.

The control logic 401 watches the oldest RobID 493. When the oldest RobID 493 matches the RobID 354 of the NRRB 404, the control logic 401 sends the nonc read request 451 to the DTLB 141 and L2 cache 107, copies the RobID 354 from the NRRB 404 entry to the RobID 374 of the NDB 402 (but keeps the NDB 402 invalid), and invalidates the NRRB 404. The DTLB 141 translates the virtual address 352 into a physical address, which the L2 cache 107 sends along with the size 356 on the processor bus 183 to read the specified bytes of nonc data from the memory-mapped I/O device 204.

When the response to the nonc read request 451 is received in the form of the nonc data read from the I/O device, the control logic 401 writes the nonc data as data in 495 into the NDB 402 and validates the NDB 402. The nonc load instruction is awakened when the response to the nonc read request 451 writes the nonc data into the NDB 402 such that the scheduler 121 subsequently issues the nonc load instruction a third time to the LSU 117. When the LSU 117 executes the nonc load instruction the third time, the control logic 401 detects that the load/store RobID 491 matches the RobID 374 of the NDB 402, controls the mux 443 to select the nonc read data 445 from the NDB 402 as the data out 427 rather than the cache data 439, and invalidates the NDB 402, thus completing execution of the nonc load instruction. During the third execution of the load instruction, because of the RobID match, the control logic 401 may ignore the VIVTFLDC 103 access, i.e., may ignore the hit indicator 452 and translation information 425.

Processing of a nonc store instruction from the point at which the nonc store instruction hits on a data-less entry 301 of the VIVTFLDC 103 will now be described. Similar to the normal case, the nonc store data 493 from the register file 105 is written into the previously allocated SQ 125 entry. However, when the nonc store instruction is committed (e.g., becomes the oldest instruction in the ROB 122, or at least is known to be abort-free), the nonc store data is sent from the SQ 125 entry as a write request 453 to the DTLB 141 and L2 cache 107. The DTLB 141 translates the nonc store virtual address into a physical address that is sent along with the nonc store data and its size to the L2 cache 107, which forwards the physical address, the nonc data and its size to the processor bus 183 such that the nonc data is written to the I/O device 204. Specifically, the nonc store data is not written to the VIVTFLDC 103.

Figure 5A:
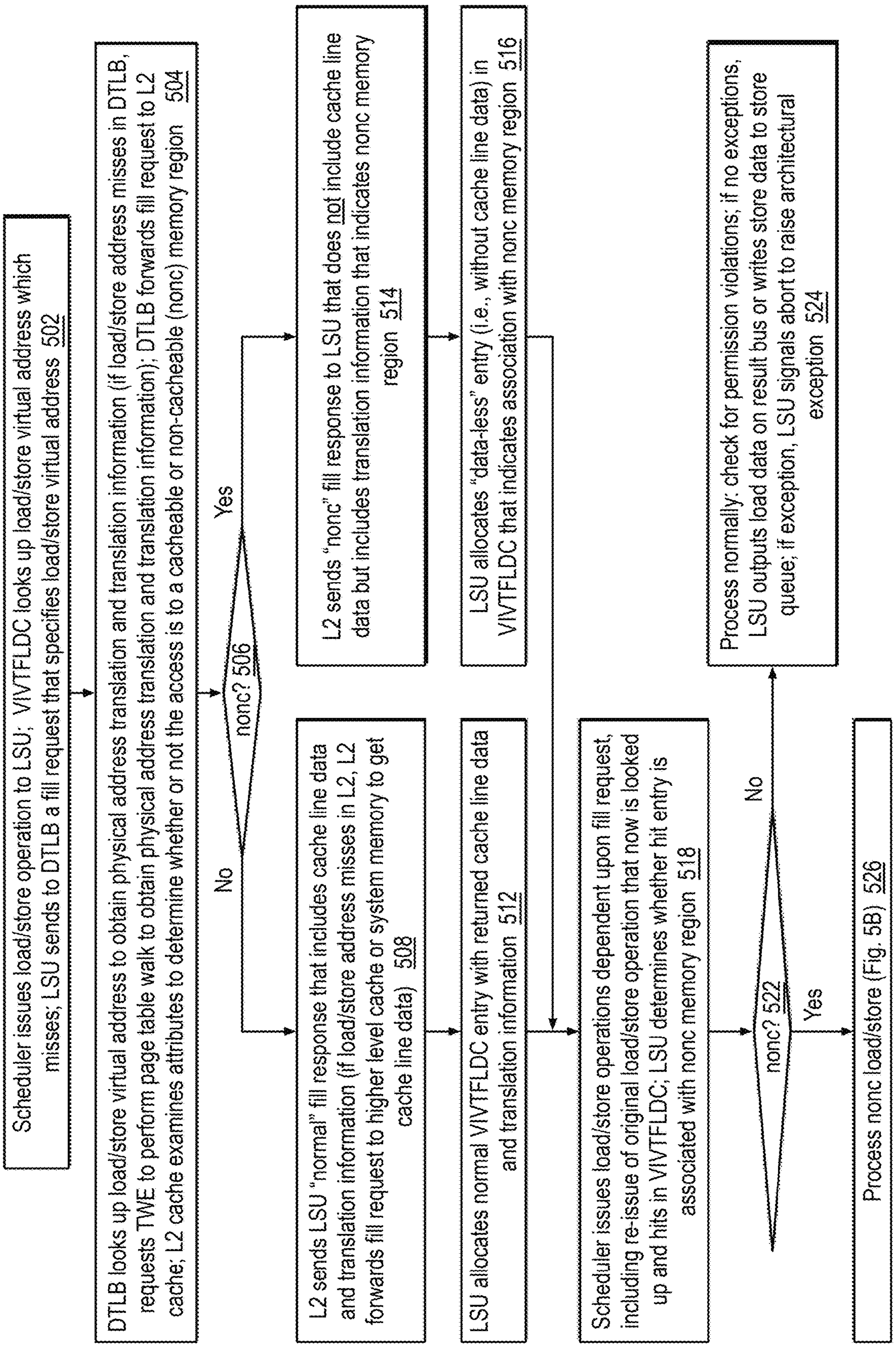
FIG. 5A is an example flowchart illustrating operation of a system that includes a processor that includes a VIVTFLDC to process a non-cacheable load/store instruction according to embodiments of the present disclosure.

FIG. 5A is an example flowchart illustrating operation of a system (e.g., system 200 of FIG. 2) that includes a processor (e.g., processor 100 of FIG. 1) that includes a virtually-indexed, virtually-tagged first-level data cache (e.g., VIVTFLDC 103 of FIG. 1) to process a nonc load/store instruction according to embodiments of the present disclosure. Operation begins at block 502.

At block 502, a scheduler (e.g., scheduler 121 of FIG. 1) issues a load/store instruction to a LSU (e.g., LSU 117 of FIG. 2). The LSU accesses the VIVTFLDC using a virtual load/store address (e.g., virtual load/store address 423 of FIG. 4) specified by the load/store instruction which misses in the VIVTFLDC. In response, the LSU generates a fill request (e.g., fill request 433 of FIG. 4) that specifies the virtual load/store address and that is sent to a data translation lookaside buffer (e.g., DTLB 141 of FIG. 1). Operation proceeds to block 504.

At block 504, the DTLB looks up the load/store address to obtain an address translation and translation information associated with the load/store address. If the load/store address misses in the DTLB, then the DTLB requests a table walk engine (e.g., TWE 145 of FIG. 1) to perform a page table walk to obtain the address translation and translation information associated with the load/store address. The DTLB forwards the fill request to the L2 cache 107 along with the address translation and the translation information. The L2 cache 107 examines the translation information to determine whether the load/store address is in a non-cacheable memory region (e.g., non-cacheable memory region 212 of FIG. 2) or in a cacheable memory region (e.g., cacheable memory region 214 of FIG. 2). In one embodiment, the load/store address is in a non-cacheable memory region if the page table entry specified by the virtual load/store address indicates a non-cacheable memory region or a MAR 127 indicates a nonc memory region. Operation proceeds to decision block 506.

At block 506, if the translation information indicates a nonc memory region, operation proceeds to block 514; otherwise, operation proceeds to block 508.

At block 508, the L2 cache sends to the LSU a normal (i.e., cacheable) fill response that includes the cache line data and translation information implicated by the load/store address as well as an indicator that indicates the load/store address is in a cacheable memory region. Additionally, if the load/store address misses in the L2 cache, the L2 cache forwards the fill request to a higher level of the cache memory hierarchy (not shown, but present in some embodiments, e.g., L3 cache) to obtain the cache line data or to a bus interface unit (e.g., bus interface unit 181 of FIG. 1) to obtain the cache line data from system memory. Operation proceeds to block 512.

At block 512, in response to the determination of a cacheable memory region indicated in the fill request response, the LSU allocates a normal entry in the VIVTFLDC and populates it with the returned cache line data and translation information. That is, the LSU allocates a normal entry (e.g., entry 301 of FIG. 3A) in the VIVTFLDC 103 that includes valid cache line data and that includes attributes that indicate a cacheable memory type. Operation proceeds to block 518.

At block 514, the L2 cache sends to the LSU a non-cacheable fill response that does not include cache line data but does include translation information implicated by the load/store address as well as an indicator that indicates the load/store address is in a non-cacheable memory region. Furthermore, due to the indication that the load/store address is in a non-cacheable memory region, no cache line data implicated by the missing load address is filled into any levels of the cache memory hierarchy. Operation proceeds to block 516.

At block 516, in response to the indication in the fill request response that the load/store address is in a non-cacheable memory region, the LSU allocates a data-less entry, i.e., without cache line data, in the VIVTFLDC. That is, the LSU allocates an entry (e.g., entry 301) and populates the translation information (e.g., translation information 309) with the returned translation information, but does not populate the allocated entry with cache line data. The data-less entry may be hit upon by the nonc load/store instruction that originally missed in the VIVTFLDC at block 502 upon retry thereof as well as any other nonc load/store instructions in the scheduler dependent upon the fill request generated at block 502 as well as any subsequent nonc load/store instructions that hit upon the data-less entry. In one embodiment, the data-less entry may be replaced by a cache line replacement or may be invalidated by an invalidate operation that implicates the entry. Operation proceeds to block 518.

At block 518, in response to the fill request response-either cacheable or non-cacheable, the scheduler begins to issue load/store instructions that are dependent upon the fill request response, which may hit upon the entry allocated at either block 512 or block 516. As described above, the entry may be hit upon by the load/store instruction that originally missed in the VIVTFLDC upon retry thereof, other load/store instructions dependent upon the fill request, and/or subsequent load/store instructions that hit upon the entry. Operation proceeds to decision block 522.

At decision block 522, if the hit upon entry indicates a non-cacheable memory region (e.g., the attributes 313 of FIG. 3A indicates a non-cacheable memory region), operation proceeds to block 526; otherwise, operation proceeds to decision block 524.

At block 524, the LSU processes the load/store instruction normally. That is, if the load/store instruction causes a need to generate an exception, the LSU signals a request for an abort, and in response control logic (e.g., abort & exception handling logic 134 of pipeline control logic 132 of FIG. 1) raises an architectural exception (assuming the abort request is the highest priority request), and in response control logic raises an architectural exception. In one embodiment, the architectural exception raised is a page fault. Otherwise, the LSU outputs the requested data from the cache line of the hit upon entry onto its result bus in the case of a load instruction, and in the case of a store instruction, the LSU writes the store data to the entry in the store queue (e.g., store queue 125 of FIG. 1) allocated for the store instruction. An example of the cacheable load/store instruction causing a need to generate an exception is if there is a user permission violation or a read or write permission violation. A user permission violation is detected if the permissions associated with the load/store address do not allow processes with user level privilege to access the load/store address and the load/store instruction is being executed for a process that has user level privilege, rather than supervisor level privilege. A read/write permission violation is detected if the load/store instruction is a store instruction and permission to read/write the store address is not allowed.

At block 526, processes the nonc load/store, which is described in detail below with respect to FIG. 5B. Similar to the manner described above with respect to block 524 for a cacheable load/store, the LSU 117 checks for permission violations by the nonc load/store and handles them if found.

Figure 5B:
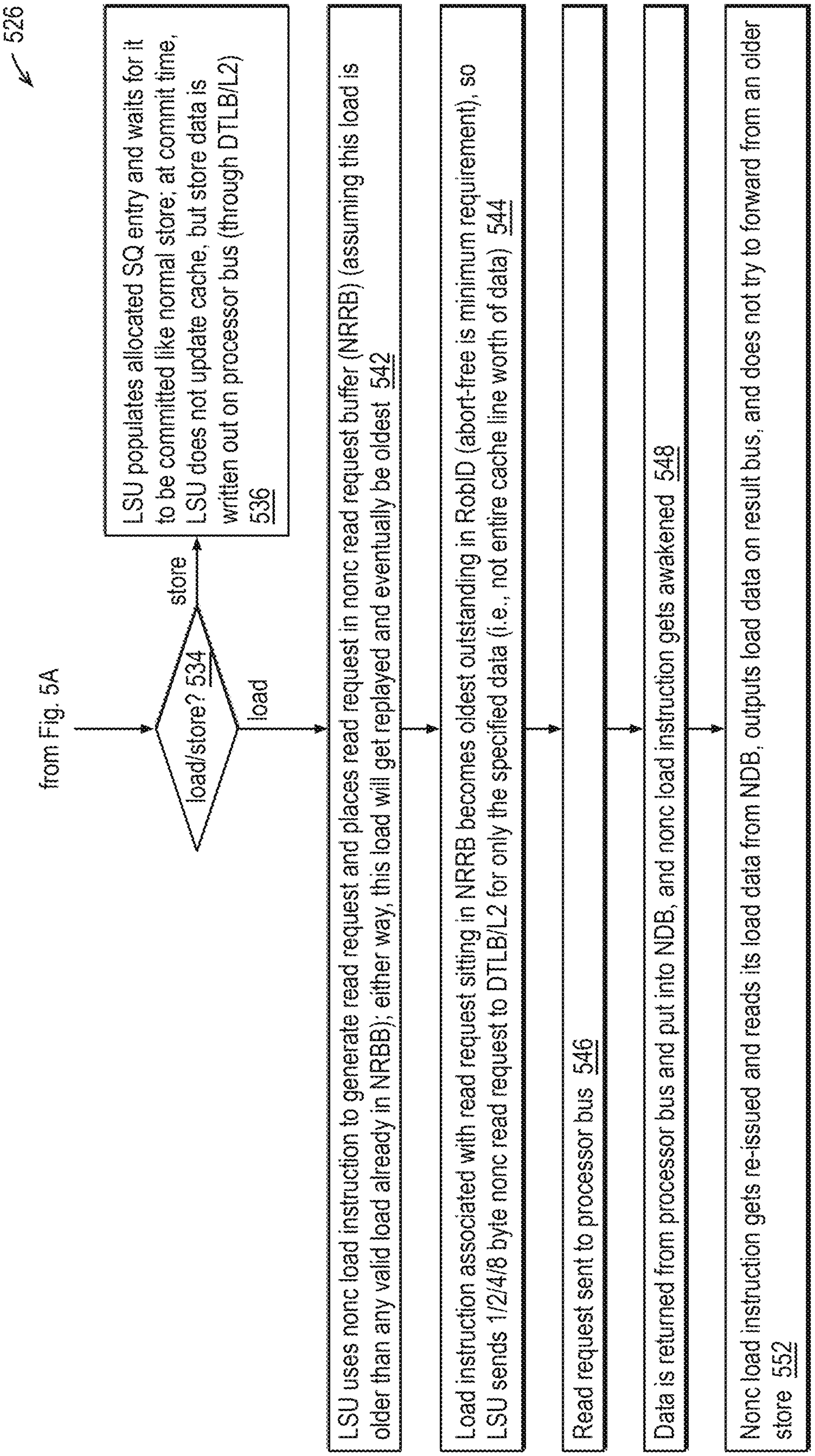
FIG. 5B is an example flowchart illustrating in more detail the operation of the LSU according to block 526 of FIG. 5A to process a non-cacheable load/store according to embodiments of the present disclosure.

FIG. 5B is an example flowchart illustrating in more detail the operation of the LSU 117 according to block 526 of FIG. 5A to process a nonc load/store according to embodiments of the present disclosure. Operation begins at decision block 534.

At decision block 534, if the nonc load/store is a store instruction, operation proceeds to block 536, whereas if the operation is a load instruction, operation proceeds to block 542.

At block 536, the LSU 117 populates the entry of the LSQ 125 previously allocated to the store instruction and waits for the store instruction to be committed as it would a normal, i.e., cacheable, store instruction. However, at commit time, unlike with a cacheable store, the LSU 117 does not update the VIVTFLDC 103 i.e., the LSU 117 does not write the store data to the VIVTFLDC 103. Instead, the LSU 117 writes the store data out on the processor bus 183, e.g., through the DTLB 141 and L2 cache 107. In an embodiment, the core 100 includes a write combine buffer (WCB) used to combine store data being written to system memory to increase write throughput and reduce contention on the processor bus 183. In such an embodiment, for some attributes indicated by the entry 301, the store data may be combined in the WCB with the data of other store operations, e.g., if the memory region has a write combine (WC) attribute; whereas, for other attributes indicated by the entry 301, the store data may not be combined in the WCB with the data of other store operations, e.g., if the memory region has an I/O attribute.

At block 542, the LSU 117 generates a nonc read request and places it in the NRRB 404 of FIG. 4. The LSU 117 forms the nonc read request based on the nonc load instruction. For example, the virtual address 352 of the NRRB entry 351 will be populated with the virtual address specified by the nonc load instruction, the RobID 354 of the NRRB entry 351 will be populated with the RobID of the nonc load instruction, the size 356 of the NRRB entry 351 will be populated with the size (i.e., number of bytes) of the nonc load instruction, and the valid bit 358 will be set to true. In an embodiment, the LSU 117 forms and places the nonc read request into the NRRB 404 only if the NRRB 404 is empty or the load instruction is older than the current nonc read request in the NRRB 404. If the load instruction is not older than the current nonc read request in the NRRB 404, the load instruction will get replayed (perhaps multiple times) and eventually become the oldest nonc load instruction and its nonc read request will get placed into the NRRB 404. Operation proceeds to decision block 544.

At block 544, the nonc load instruction associated with the nonc read request sitting in the NRRB 404 eventually becomes the oldest outstanding instruction in the ROB 122, i.e., the RobID 354 matches the RobID of the oldest instruction in the ROB 122. In an embodiment, the nonc load instruction associated with the nonc read request sitting in the NRRB 404 need not necessarily be the oldest outstanding instruction in the ROB 122, but needs to be the oldest abort-free instruction in the ROB 122, i.e., all instructions older than the nonc load instruction have been processed to the point where it is known they are no longer capable of causing an abort (i.e., that would cause the nonc load instruction to be not retired). In response, the LSU 117 sends the nonc read request to the DTLB 141 and L2 cache 107. More specifically, the nonc read request specifies only the number of bytes specified in the size 356 of the nonc read request, e.g., 1, 2, 4 or 8 bytes. That is, the nonc read request does not attempt to read an entire cache line worth of data as would a read request associated with a fill request generated in response to a cacheable load instruction, i.e., a load instruction that specifies a load address in a cacheable memory region. Operation proceeds to block 546.

At block 546, the DTLB 141 translates the virtual address 352 specified by the nonc read request into a physical address which the L2 cache 107 sends, along with the size 356, to the processor bus 183 to read the specified data from the physical address in the non-cacheable memory region 212 of the processor address space 202, e.g., from an I/O device residing at the physical address. Operation proceeds to block 548.

At block 548, the data received from the physical address (e.g., the I/O device) on the processor bus 183 is returned by the L2 cache 107 as data in 495 and written into a NDB entry 371 of the NDB 402. In response, the nonc load instruction is awakened, e.g., within the scheduler 121. Operation proceeds to block 552.

At block 552, the nonc load instruction gets issued again to the LSU 117 and reads its load data from the NDB 402. The LSU 117 then outputs the load data onto the result bus to complete execution of the nonc load instruction. Furthermore, the LSU 117 does not attempt to forward the load data of the nonc load instruction to older store instructions.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

To aid the Patent Office and any readers of this application and any patent issued on this application in interpreting the claims appended hereto, applicants wish to indicate they do not intend any of the appended claims or claim elements to invoke 35 U.S.C. § 112(f) unless the words "means for" or "step for" are explicitly used in the particular claim. Furthermore, use of the term "configured to" is not intended to invoke 35 U.S.C. § 112(f). Still further, uses of the terms "unit" (e.g., as in "load/store unit", "prediction unit", "instruction fetch unit", "execution unit", "memory management unit", etc.) or "logic" (e.g., as in "control logic") or "element" (e.g., as in "storage element") are intended to connote structure that is included in a microprocessor, which includes circuitry configured to perform disclosed operations, including storage circuitry that stores microcode processed by the circuitry.

The invention claimed is:

1. A microprocessor, comprising:

a first-level data cache configured to operate with virtual addresses; and a load/store circuit configured to:

perform a first lookup in the data cache of a virtual address specified by a load/store instruction, determine that the virtual address misses in the data cache and, in response to the miss, generate a fill request that causes the microprocessor to translate the virtual address into a physical address;

receive a response to the fill request that indicates the physical address is in a non-cacheable memory region and that is without data from the physical address;

allocate a data-less entry in the data cache that includes an indication that the data-less entry is associated with a non-cacheable memory region;

perform a second lookup of the virtual address in the data cache and determine that the virtual address hits in the data cache on the data-less entry; and determine from the hit data-less entry that the data-less entry is associated with a non-cacheable memory region accessible via a processor bus of the microprocessor.

2. The microprocessor of claim 1, wherein each entry of the data cache comprises storage for holding:

cache line data;

a virtual address tag; and translation information that is usable to determine whether the data-less entry is associated with a non-cacheable memory region.

3. The microprocessor of claim 2, wherein each entry of the data cache further comprises storage for holding translation information that is usable to determine whether permission to read from the physical address associated with the data-less entry is allowed.

4. The microprocessor of claim 1, further comprising:

a memory management circuit configured to:

translate the virtual address into the physical address in response to the fill request;
determine that the physical address is in a non-cacheable memory region;
refrain from causing a transaction on the processor bus at the physical address; and
provide, to the load/store circuit, the response to the fill request that indicates the physical address is in a non-cacheable memory region and that is without data from the physical address.

5. The microprocessor of claim 1, wherein the load/store instruction comprises a load instruction, wherein the physical address comprises a load physical address, and wherein the load/store circuit is further configured to generate a read request to read data from the processor bus at the load physical address rather than providing data from the hit data-less entry.

6. The microprocessor of claim 5, wherein the load/store circuit is further configured to:
receive a response to the read request that includes the data from the processor bus; and
provide the received data as load data of the load instruction.

7. The microprocessor of claim 5, further comprising:
a non-cacheable read request buffer configured to hold the generated read request;
wherein the load/store circuit is further configured to determine whether the load instruction is at least free from being aborted and, if so, to cause the read request in the read request buffer to be sent to the processor bus to read the data at the physical address.

8. The microprocessor of claim 5, further comprising:
a non-cacheable data buffer configured to receive the data from the processor bus at the load physical address; and
wherein the load/store circuit is further configured to provide the received data as load data of the load instruction.

9. The microprocessor of claim 1, wherein the load/store instruction comprises a store instruction, wherein the physical address comprises a store physical address, and wherein the load/store circuit is further configured to write store data of the store instruction to a store queue entry to be subsequently written to the processor bus at the store physical address rather than writing the store data to the data cache.

10. A method for use in a microprocessor comprising a first-level data cache configured to operate with virtual addresses, comprising:
performing a first lookup in the data cache of a virtual address specified by a load/store instruction;
determining whether the virtual address misses in the data cache;
in response to the virtual address missing in the data cache, generating a fill request that causes the processor to translate the virtual address into a physical address;
receiving a response to the fill request that indicates the physical address is in a non-cacheable memory region and that is without data from the physical address;
allocating a data-less entry in the data cache that includes an indication that the data-less entry is associated with a non-cacheable memory region;
performing a second lookup of the virtual address in the data cache and determining that the virtual address hits in the data cache on the data-less entry; and
determining from the hit data-less entry that the data-less entry is associated with a non-cacheable memory region accessible via a processor bus of the microprocessor.

11. The method of claim 10,
wherein each entry of the data cache comprises storage for holding:
cache line data;
a virtual address tag; and
translation information that is usable to determine whether the data-less entry is associated with a non-cacheable memory region.

12. The method of claim 11, wherein each entry of the data cache further comprises storage for holding translation information that is usable to determine whether permission to read from the physical address associated with the entry is allowed.

13. The method of claim 10, further comprising:
translating the virtual address into the physical address in response to the fill request;
determining that the physical address is in a non-cacheable memory region;
refraining from causing a transaction on the processor bus at the physical address; and
providing, to the load/store circuit, the response to the fill request that indicates the physical address is in a non-cacheable memory region and that is without data from the physical address.

14. The method of claim 10, wherein the load/store instruction comprises a load instruction and wherein the physical address comprises a load physical address, further comprising generating a read request to read data from the processor bus at the load physical address rather than providing data from the hit data-less entry.

15. The method of claim 14, further comprising:
receiving a response to the read request that includes the data from the processor bus; and
providing the received data as load data of the load instruction.

16. The method of claim 14, further comprising:
holding the generated read request in a non-cacheable read request buffer of the microprocessor; and
determining whether the load instruction is at least free from being aborted and, if so, causing the read request in the read request buffer to be sent to the processor bus to read the data at the physical address.

17. The method of claim 14, further comprising:
receiving the data from the processor bus at the load physical address into a non-cacheable data buffer of the microprocessor; and
providing the received data as load data of the load instruction.

18. The method of claim 10, wherein the load/store instruction comprises a store instruction and wherein the physical address comprises a store physical address, further comprising writing store data of the store instruction to a store queue entry to be subsequently written to the processor bus at the store physical address rather than writing the store data to the data cache.

19. A non-transitory computer-readable medium having instructions stored thereon that are capable of causing or configuring a microprocessor comprising:
a first-level data cache configured to operate with virtual addresses; and
a load/store circuit configured to:
perform a first lookup in the data cache of a virtual address specified by a load/store instruction, determine that the virtual address misses in the data cache and, in response to the miss, generate a fill request that causes the microprocessor to translate the virtual address into a physical address;

receive a response to the fill request that indicates the physical address is in a non-cacheable memory region and that is without data from the physical address;

allocate a data-less entry in the data cache that includes an indication that the data-less entry is associated with a non-cacheable memory region;

perform a second lookup of the virtual address in the data cache and determine that the virtual address hits in the data cache on the data-less entry; and determine from the hit data-less entry that the data-less entry is associated with a non-cacheable memory region accessible via a processor bus of the microprocessor.

20. The non-transitory computer-readable medium of claim 19, wherein each entry of the data cache comprises storage for holding:

cache line data;

a virtual address tag; and translation information that is usable to determine whether the data-less entry is associated with a non-cacheable memory region.

21. The non-transitory computer-readable medium of claim 20, wherein each entry of the data cache further comprises storage for holding:

translation information that is usable to determine whether permission to read from the physical address associated with the data-less entry is allowed.

22. The non-transitory computer-readable medium of claim 19, further comprising:

a memory management circuit configured to:

translate the virtual address into the physical address in response to the fill request;

determine that the physical address is in a non-cacheable memory region;

refrain from causing a transaction on the processor bus at the physical address; and provide, to the load/store circuit, the response to the fill request that indicates the physical address is in a non-cacheable memory region and that is without data from the physical address.

23. The non-transitory computer-readable medium of claim 19, wherein the load/store instruction comprises a load instruction, wherein the physical address comprises a load physical address, and wherein the load/store circuit is further configured to generate a read request to read data from the processor bus at the load physical address rather than providing data from the hit data-less entry.

24. The non-transitory computer-readable medium of claim 23, wherein the load/store circuit is further configured to:

receive a response to the read request that includes the data from the processor bus; and provide the received data as load data of the load instruction.

25. The non-transitory computer-readable medium of claim 23, further comprising:

a non-cacheable read request buffer configured to hold the generated read request;

wherein the load/store circuit is further configured to determine whether the load instruction is at least free from being aborted and, if so, to cause the read request in the read request buffer to be sent to the processor bus to read the data at the physical address.

26. The non-transitory computer-readable medium of claim 23, further comprising:

a non-cacheable data buffer configured to receive the data from the processor bus at the load physical address; and wherein the load/store circuit is further configured to provide the received data as load data of the load instruction.

27. The non-transitory computer-readable medium of claim 19, wherein the load/store instruction comprises a store instruction, wherein the physical address comprises a store physical address, and wherein the load/store circuit is further configured to write store data of the store instruction to a store queue entry to be subsequently written to the processor bus at the store physical address rather than writing the store data to the data cache.

* * * * *